(12) United States Patent
Heuer et al.

(10) Patent No.: US 7,345,133 B2
(45) Date of Patent: Mar. 18, 2008

(54) BRANCHED POLYCARBONATES

(75) Inventors: Helmut-Werner Heuer, Krefeld (DE); Rolf Wehrmann, Krefeld (DE); Ulrich Blaschke, Krefeld (DE); Michael Erkelenz, Duisburg (DE)

(73) Assignee: Bayer Materialscience AG, Leverkusen (DE)

( * ) Notice: Subject to any disclaimer, the term of this patent is extended or adjusted under 35 U.S.C. 154(b) by 117 days.

(21) Appl. No.: 11/263,678

(22) Filed: Nov. 1, 2005

(65) Prior Publication Data

US 2006/0094855 A1 May 4, 2006

(30) Foreign Application Priority Data

Nov. 3, 2004 (DE) .................. 10 2004 053 047

(51) Int. Cl.
*C08G 64/00* (2006.01)
(52) U.S. Cl. .................. 528/196; 264/176.1; 264/219; 502/150; 502/208; 528/198
(58) Field of Classification Search ............. 264/176.1, 264/219; 528/196, 198
See application file for complete search history.

(56) References Cited

U.S. PATENT DOCUMENTS

| | | | | |
|---|---|---|---|---|
| 3,281,478 A | 10/1966 | Farnham | .................. | 260/519 |
| 4,185,009 A | 1/1980 | Idel et al. | .................. | 260/45.9 R |
| 5,367,044 A | 11/1994 | Rosenquist | .................. | 528/204 |
| 6,258,922 B1 * | 7/2001 | Okamoto et al. | .................. | 528/196 |
| 6,528,612 B1 | 3/2003 | Brenner et al. | .................. | 528/271 |
| 6,613,869 B1 | 9/2003 | Horn et al. | .................. | 528/198 |

FOREIGN PATENT DOCUMENTS

DE 42 40 313 A1 6/1994
JP 06009768 * 1/1994

OTHER PUBLICATIONS

Patent Abstracts of Japan Bd. 018, Nr. 209 (C-1190), Apr. 13, 1994 & JP 06 009768 A (Teijin Chem Ltd), Jan. 18, 1994.

Dobkowski Z.: "Dependence of polymer specific volume on molecular characteristics" European Polymer Journal, Bd. 20, Nr. 4, 1984, Seiten 399-403, XP002361625.

Polish Journal of Applied Chemistry, 40(3), (month unavailable) 1997, pp. 247-254, Ewa Nowakowska et al, "Studies of Some Impurities in Commercial Bisphenols-A".

Vyzk. Ustav Org. Synt., Chemicky Prumysl 29(1), (month unavailable) 1979, pp. 30-34, J. Pryzkova et al, Identifikace vedlejších produktů v dianu.

* cited by examiner

*Primary Examiner*—Terressa Boykin
(74) *Attorney, Agent, or Firm*—Noland J. Cheung; Aron Preis

(57) ABSTRACT

A branched polycarbonate and processes for its preparation are disclosed. The polycarbonate contains structural units conforming to

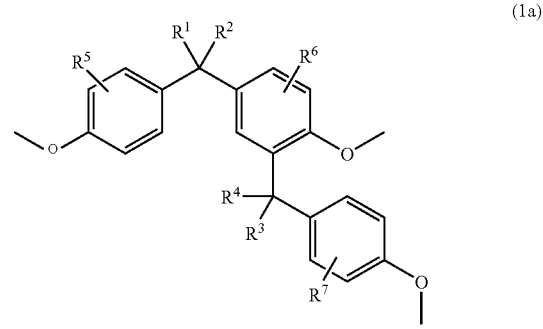

(1a)

in which $R^1$, $R^2$, $R^3$ and $R^4$ mutually independently denote $C_1$-$C_{10}$ alkyl, $R^5$, $R^6$ and $R^7$ mutually independently denote hydrogen or $C_1$-$C_{10}$ alkyl, or $R^1$ and $R^2$, and $R^3$ and $R^4$, with the carbon atom to which they are attached, form a $C_5$-$C_{10}$ cycloalkyl group, wherein the cycloalkyl group may be substituted.

4 Claims, No Drawings

BRANCHED POLYCARBONATES

FIELD OF THE INVENTION

The invention is directed to aromatic polycarbonates and more particularly to branched polycarbonates.

BACKGROUND OF THE INVENTION

Aromatic polycarbonates belong to the group of engineering thermoplastics. They are distinguished by the combination of the properties transparency, heat resistance and toughness which are significant in engineering applications.

High molecular weight linear polycarbonates are obtained by the phase boundary process by reacting the alkali metal salts of bisphenols with phosgene in the two-phase mixture. Molecular weight may be controlled by the quantity of monophenols, such as for example phenol or tert.-butylphenol. These reactions virtually exclusively yield linear polymers. This may be demonstrated by end group analysis.

With regard to the production of linear polycarbonates by the phase boundary process, reference is made by way of example to H. Schnell, Chemistry and Physics of Polycarbonates, Polymer Reviews, vol. 9, Interscience Publishers, New York 1964 p. 33 et seq. and to Polymer Reviews, vol. 10, "Condensation Polymers by Interfacial and Solution Methods", Paul W. Morgan, Interscience Publishers, New York 1965, chapter VIII, p. 325.

U.S. Pat. No. 4,185,009, DE A 25 00 092 and JP B 79039040 describe a process in which, starting from mixtures of specific bisphenols with chain terminators and isatin bisphenols as branching agents, branched, high molecular weight polycarbonates may be obtained after reaction with phosgene in a phase boundary reaction. DE A 42 40 313 describes copolycarbonates with improved flowability based on bisphenol A and bisphenol TMC with isatin biscresol as branching agent.

DE A 19 913 533 describes highly crosslinked polycarbonates, the production of which involves the use of oligomeric or polymeric branching agents. DE A 19 943 642 mentions branched polycarbonates which, by virtue of their pseudoplasticity, are suitable for use as a water bottle material.

U.S. Pat. No. 5,367,044 accordingly describes bottles made from branched polycarbonate, in which 1,1,1-tris-(4-hydroxyphenyl)ethane (THPE) is used as the branching agent in quantities of 0.28-0.36 mol %.

Because of their better flowability in comparison with linear polycarbonates, branched polycarbonates are especially of interest for applications in which good flow of the polymer melt at relatively high shear rates is desired, i.e. for example when injection molding complex structures. Branched polycarbonates are distinguished by pseudoplasticity and can no longer be considered Newtonian fluids.

In the prior art, high purity trifunctional products are used as branching agents. It would be advantageous to use trifunctional compounds which can be produced straightforwardly and contain only bisphenols as secondary components, which do not require troublesome separation.

SUMMARY OF THE INVENTION

A branched polycarbonate and processes for its preparation are disclosed. The polycarbonate contains structural units conforming to

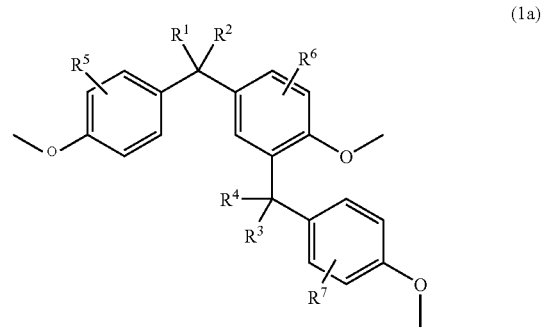

(1a)

in which $R^1$, $R^2$, $R^3$ and $R^4$ mutually independently denote $C_1$-$C_{10}$ alkyl, $R^5$, $R^6$ and $R^7$ mutually independently denote hydrogen or $C_1$-$C_{10}$ alkyl, or $R^1$ and $R^2$, and $R^3$ and $R^4$, with the carbon atom to which they are attached, form a $C_5$-$C_{10}$ cycloalkyl group, wherein the cycloalkyl group may be substituted.

DETAILED DESCRIPTION OF THE INVENTION

The object accordingly arose of providing long-chain branched polycarbonates and processes for the production thereof which avoid these disadvantages. This object has surprisingly been achieved by the use of at least one branching agent of the general formula (1):

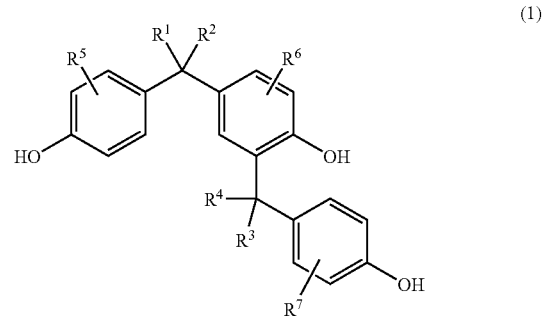

(1)

in which $R^1$, $R^2$, $R^3$ and $R^4$ mutually independently denote $C_1$-$C_{10}$ alkyl, preferably $C_1$-$C_8$ alkyl, particularly preferably $C_1$-$C_6$ alkyl, very particularly preferably methyl, $R^5$, $R^6$ and $R^7$ mutually independently denote hydrogen or $C_1$-$C_{10}$ alkyl, preferably $C_1$-$C_8$ alkyl, particularly preferably hydrogen or $C_1$-$C_6$ alkyl, very particularly preferably hydrogen, or $R^1$ and $R^2$, and $R^3$ and $R^4$ may, with the carbon atom to which they are attached, independently form $C_5$-$C_{10}$ cycloalkyl, preferably $C_5$-$C_8$ cycloalkyl, in particular cyclopentyl or cyclohexyl, wherein the cycloalkyl ring may preferably be substituted by $C_1$-$C_4$ alkyl, in particular methyl.

The above-stated alkyl substituents may be linear or branched. Particularly preferred compounds are those of the general formula (2), which are derived from bisphenol A derivatives and in which $R^5$, $R^6$ and $R^7$ have the above-stated meaning.

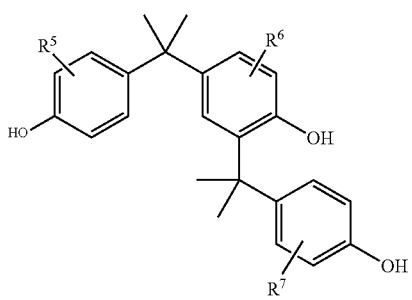

(2)

One very particularly preferred branching agent is that of the formula (3):

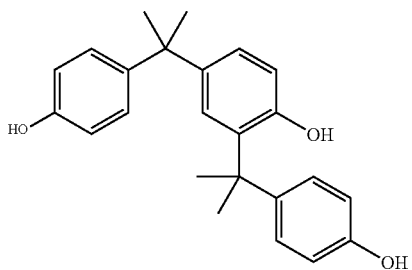

(3)

The compounds of the formulae (1), (2) and (3) are known or may be produced using known processes.

The compound of the formula (3) is for example described in E. Nowakowska, K. Zdzislaw, Polish Journal of Applied Chemistry, 40(3), 247 (1997), in J. Paryzkova, D. Snobl, P. Matousek, Vyzk. Ustav Org. Synt., Chemicky Prumysl 29(1), 30, (1979) and in U.S. Pat. No. 3,281,478 of Union Carbide Corp., New York (Oct. 25, 1966).

These branching agents according to the invention may be produced from bisphenol A derivatives or bisphenol derivatives and sodium bisphenolates, in the simplest case for example with bisphenol A (BPA) and sodium bisphenolate A ($Na_2BPA$) in a melt at temperatures of 120 to 230° C., preferably 130 to 220° C., particularly preferably 150 to 210° C., very particularly preferably 160 to 200° C., with removal of the eliminated phenol (c.f. Example and, for example, U.S. Pat. No. 3,281,478).

Surprisingly, it has also been found that the crude product resulting from the production of the branching agent may be used without further elaborate purification, as the only appreciable impurity in the crude product merely consists of bisphenol. This content of bisphenol may be included in the calculation on synthesis of the branched polycarbonates. This content varies from batch to batch and may, for example, simply be determined by gas chromatography prior to use.

One substantial advantage is accordingly also that the branching agent may be used for the synthesis of polycarbonates directly, i.e. in the technical form in which it is produced, for example from the distillation of BPA streams in BPA production, from recrystallization or melt crystallization.

The branched polycarbonates furthermore exhibit the thermal stability required for certain applications.

The present invention provides polycarbonates containing branching structures of the formula (1a) which are derived via the OH group from compounds of the formula (1)

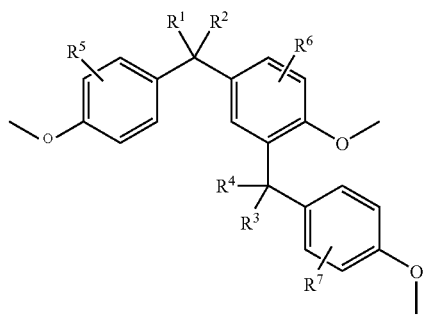

(1a)

in which R1 to $R^7$ have the above-stated meanings.

Preferred polycarbonates are those containing the branching structures of the formula (2a)

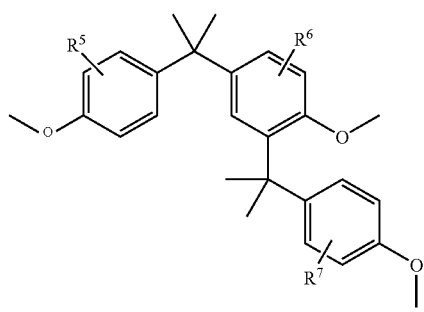

(2a)

in which $R^5$, $R^6$ and $R^7$ have the above-stated meanings.

Particularly preferred polycarbonates are those containing the branching structure of the formula (3a)

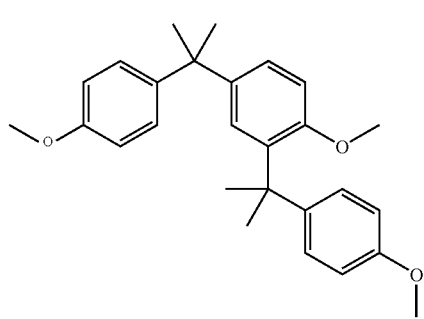

(3a)

The polycarbonates according to the invention may be produced, for example, by reacting diphenols with carbonic acid halides, preferably phosgene and/or with aromatic dicarboxylic acid dihalides, preferably benzenedicarboxylic acid dihalides and/or with diphenyl carbonate using at least one of the branching agents according to the invention of the formula (1) or of the preferred formulae (2) and/or (3).

The polycarbonates according to the invention contain at least one diphenol residue of the formula (4)

—O-D-O— in which each D independently of the other represents an aromatic radical having from 6 to 40 carbon atoms, preferably from 6 to 35 carbon atoms, especially from 6 to 30 carbon atoms, said radical optionally containing hetero atoms, and is optionally substituted by $C_1$-$C_{12}$-alkyl, preferably $C_1$-$C_{10}$-alkyl, particularly preferably $C_1$-$C_8$-alkyl, and/or by halogen, preferably fluorine or chlorine, and is further optionally containing aliphatic or cycloaliphatic radicals.

In the formula (4), D preferably conforms to formula (5)

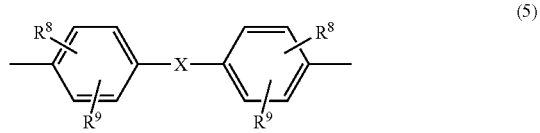

(5)

in which $R^8$ and $R^9$ mutually independently denote H, $C_1$-$C_{18}$ alkyl, $C_1$-$C_{18}$ alkoxy, halogen such as Cl or Br or in each case optionally substituted aryl or aralkyl, preferably H or $C_1$-$C_{12}$ alkyl, particularly preferably H or $C_1$-$C_8$ alkyl and very particularly preferably H or methyl, and X denotes a single bond, —$SO_2$—, —CO—, —O—, —S—, $C_1$ to $C_6$ alkylene, $C_2$ to $C_5$ alkylidene or $C_5$ to $C_6$ cycloalkylidene, which may be substituted with $C_1$ to $C_6$ alkyl, preferably methyl or ethyl, or further denotes $C_6$ to $C_{12}$ arylene, which may optionally be fused with further aromatic rings containing heteroatoms.

X preferably denotes a single bond, $C_1$ to $C_5$ alkylene, $C_2$ to $C_5$ alkylidene, $C_5$ to $C_6$ cycloalkylidene, —O—, —SO—, —CO—, —S—, —$SO_2$—, or conforms to formulas (5a) or (5b)

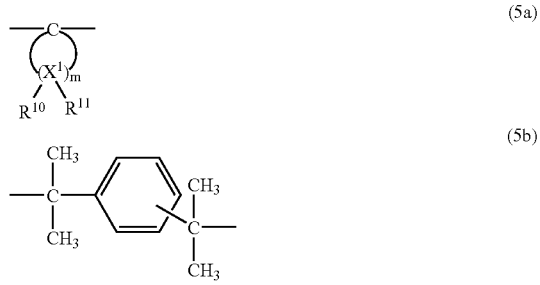

wherein $R^{10}$ and $R^{11}$, individually selectably for each $X^1$, mutually independently mean hydrogen or $C_1$ to $C_6$ alkyl, preferably hydrogen, methyl or ethyl and $X^1$ means carbon and m means an integer from 4 to 7, preferably 4 or 5, with the proviso that, on at least one atom $X^1$, $R^{10}$ and $R^{11}$ are simultaneously alkyl.

Dihydroxy compounds which are stated by way of example include hydroquinone, resorcinol, dihydroxybiphenyls, bis(hydroxyphenyl)alkanes, bis(hydroxyphenyl)cycloalkanes, bis(hydroxyphenyl) sulfides, bis(hydroxyphenyl) ethers, bis(hydroxyphenyl) ketones, bis(hydroxyphenyl) sulfones, bis(hydroxyphenyl) sulfoxides, α,α'-bis(hydroxyphenyl)diisopropylbenzenes, and the ring-alkylated and ring-halogenated compounds thereof, and also α,ω-bis(hydroxyphenyl) polysiloxanes.

Preferred diphenols are 4,4'-dihydroxybiphenyl (DOD), 4,4'-dihydroxybiphenyl ether (DOD ether), 2,2-bis(4-hydroxyphenyl)propane (bisphenol A), 1,1-bis(4-hydroxyphenyl)-3,3,5-trimethylcyclohexane (bisphenol TMC), 1,1-bis-(4-hydroxyphenyl)cyclohexane, 2,4-bis(4-hydroxyphenyl)-2-methylbutane, 1,1-bis(4-hydroxyphenyl)-1-phenylethane, 1,4-bis[2-(4-hydroxyphenyl)-2-propyl]benzene, 1,3-bis[2-(4-hydroxyphenyl)-2-propyl]benzene (bisphenol M), 2,2-bis(3-methyl-4-hydroxyphenyl)propane, 2,2-bis(3-chloro-4-hydroxyphenyl)propane, bis(3,5-dimethyl-4-hydroxyphenyl)methane, 2,2-bis(3,5-dimethyl-4-hydroxyphenyl)propane, bis(3,5-dimethyl-4-hydroxyphenyl) sulfone, 2,4-bis(3,5-dimethyl-4-hydroxyphenyl)-2-methylbutane, 2,2-bis(3,5-dichloro-4-hydroxyphenyl)propane and 2,2-bis(3,5-dibromo-4-hydroxyphenyl)propane.

Particularly preferred diphenols are 2,2-bis(4-hydroxyphenyl)propane (bisphenol A), 4,4'-dihydroxybiphenyl (DOD), 4,4'-dihydroxybiphenyl ether (DOD ether), 1,3-bis[2-(4-hydroxyphenyl)-2-propyl]benzene (bisphenol M), 2,2-bis(3,5-dimethyl-4-hydroxyphenyl)propane, 1,1-bis(4-hydroxyphenyl)-1-phenylethane, 2,2-bis(3,5-dichloro-4-hydroxyphenyl)propane, 2,2-bis(3,5-dibromo-4-hydroxyphenyl)propane, 1,1-bis(4-hydroxyphenyl)cyclohexane and 1,1-bis(4-hydroxyphenyl)-3,3,5-trimethylcyclohexane (bisphenol TMC).

Very particularly preferred compounds are 2,2-bis(4-hydroxyphenyl)propane (bisphenol A), 4,4'-dihydroxybiphenyl (DOD), 4,4'-dihydroxybiphenyl ether (DOD ether), 1,3-bis[2-(4-hydroxyphenyl)-2-propyl]benzene (bisphenol M) and 1,1-bis(4-hydroxyphenyl)-3,3,5-trimethylcyclohexane (bisphenol TMC).

The diphenols may be used both alone and as a mixture with one another. For the purposes of the present invention, polycarbonates should accordingly be taken to mean both homopolycarbonates and copolycarbonates. Copolycarbonates generally contain at least up to 50 mol %, preferably up to 45 mol %, particularly preferably up to 40 mol %, in particular up to 30 mol % (relative to the total number of moles of diphenols used) of at least one further diphenol selected from among formula 4 and/or 5. The diphenols are known from the literature or may be produced using processes known from the literature (c.f. for example. H. J. Buysch et al., Ullmann's Encyclopedia of Industrial Chemistry, VCH, New York 1991, 5th ed., vol. 19, p. 348).

The branching agents of the formulae (1) to (3) are preferably used in quantities of between 0.05 and 10 mol %, particularly preferably of 0.1-5 mol %, very particularly preferably of 0.2-1 mol %, relative to the number of moles of diphenols used.

The polycarbonates according to the invention generally have molecular weights (weight average) of 13,000 to 100,000, preferably of 15,000 to 80,000, particularly preferably of 15,000 to 60,000 g/mol, determined by gel permeation chromatography (GPC) calibrated against polycarbonate with bisphenol A as the diphenol building block.

The present invention furthermore relates to a process for the production of branched polycarbonates and copolycarbonates, characterised in that diphenols and branching agents of the formula (1) or (2) or (3) are dissolved in an aqueous alkaline solution and are reacted with a source of carbonate such as phosgene, optionally dissolved in a solvent, in a two-phase mixture prepared from an aqueous alkaline solution, an organic solvent and a catalyst, preferably an amine compound. The reaction may also be performed in multiple stages.

The concentration of diphenols including the branching agents in the aqueous alkaline solution is 2 to 25 wt. %, preferably 2 to 20 wt. % particularly preferably 2 to 18 wt. % and very particularly preferably 3 to 15 wt. %. The aqueous alkaline solution consists of water, in which hydroxides of alkali or alkaline earth metals are dissolved. Sodium and potassium hydroxide are preferred.

When phosgene is used as the carbonate source, the ratio by volume of aqueous alkaline solution to organic solvent is 5:95 to 95:5 preferably 20:80 to 80:20, particularly preferably 30:70 to 70:30 and very particularly preferably 40:60 to 60:40. The bisphenol:phosgene molar ratio is less than 1:10, preferably less than 1:6, particularly preferably less than 1:4 and very particularly preferably less than 1:3. The concentration of the branched polycarbonates and copolycarbonates according to the invention is 1.0 to 25 wt. %, preferably 2 to 20 wt. % particularly preferably 2 to 18 wt. % and very particularly preferably 3 to 15 wt. %.

The concentration of the amine compound relative to the introduced quantity of bisphenol is 0.1 to 10 mol %, preferably 0.2 to 8 mol-%, particularly preferably 0.3 to 6 mol % and very particularly preferably 0.4 to 5 mol %.

The carbonate source is phosgene, diphosgene or triphosgene, preferably phosgene. In the event that phosgene is used, it is optionally possible to dispense with a solvent and the phosgene may be introduced directly into the reaction mixture.

Tertiary amines such as triethylamine or N-alkylpiperidines may be used as the catalyst. Trialkylamines and 4-(dimethylamino)pyridine are suitable catalysts. Triethylamine, tripropylamine, triisopropylamine, tributylamine, triisobutylamine, N-methylpiperidine, N-ethylpiperidine and N-propylpiperidine are particularly suitable.

Organic solvents which may be considered are halogenated hydrocarbons such as methylene chloride and/or chlorobenzene, dichlorobenzene, trichlorobenzene or mixtures thereof or aromatic hydrocarbons, such as for example, toluene or xylenes.

The reaction temperature may be 5° C. to 100° C., preferably 0° C. to 80° C., particularly preferably 10° C. to 70° C. and very particularly preferably 10° C. to 60° C.

Alternatively, the polycarbonates according to the invention may also be produced by the melt transesterification process. The melt transesterification process is described, for example, in the Encyclopedia of Polymer Science, vol. 10 (1969), Chemistry and Physics of Polycarbonates, Polymer Reviews, H. Schnell, vol. 9, John Wiley and Sons, Inc. (1964) and DE-C 10 31 512.

In the melt transesterification process, the aromatic diphenols and branching agents already described for the phase boundary process are melt transesterified with carbonic acid diesters with the assistance of suitable catalysts and optionally further additives.

For the purposes of the invention, carbonic acid diesters are preferably those of the formulae (6) and (7)

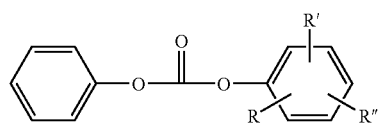

(6)

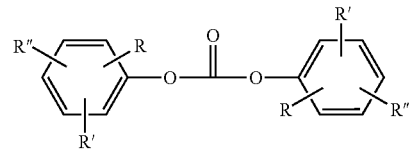

(7)

wherein

R, R' and R" are mutually independently H, $C_1$-$C_{34}$ alkyl, $C_5$-$C_{34}$ cycloalkyl, $C_7$-$C_{34}$ alkaryl or $C_6$-$C_{34}$ aryl.

The following may be stated by way of example:

Diphenyl carbonate, butylphenyl-phenyl carbonate, di-butylphenyl carbonate, isobutylphenyl-phenyl carbonate, di-isobutylphenyl carbonate, tert.-butylphenyl-phenyl carbonate, di-tert.-butylphenyl carbonate, n-pentylphenyl-phenyl carbonate, di-(n-pentylphenyl) carbonate, n-hexylphenyl-phenyl carbonate, di-(n-hexylphenyl) carbonate, cyclohexylphenyl-phenyl carbonate, di-cyclohexylphenyl carbonate, phenylphenol-phenyl carbonate, di-phenylphenol carbonate, isooctylphenyl-phenyl carbonate, di-isooctylphenyl carbonate, n-nonylphenol-phenyl carbonate, di-(n-nonylphenol) carbonate, cumylphenyl-phenyl carbonate, di-cumylphenyl carbonate, naphthylphenyl-phenyl carbonate, di-naphthylphenyl carbonate, di-tert.-butylphenyl-phenyl carbonate, di-(di-tert.-butylphenyl) carbonate, dicumylphenyl-phenyl carbonate, di-(dicumylphenyl) carbonate, phenoxyphenyl-phenyl carbonate, di-(4-phenoxyphenyl) carbonate, 3-pentadecylphenyl-phenyl carbonate, di-(3-pentadecylphenyl) carbonate, tritylphenyl-phenyl carbonate, di-tritylphenyl carbonate.

Preferred compounds are diphenyl carbonate, tert.-butylphenyl-phenyl carbonate, di-tert.-butylphenyl carbonate, phenylphenol-phenyl carbonate, di-phenylphenol carbonate, cumylphenyl-phenyl carbonate, di-cumylphenyl carbonate. Diphenyl carbonate is particularly preferred.

Mixtures of the above-stated carbonic acid diesters may also be used.

The proportion of carbonic acid diesters relative to diphenols amounts to 100 to 130 mol %, preferably 103 to 120 mol %, particularly preferably 103 to 109 mol %.

The catalysts used for the purposes of the invention in the melt transesterification process are, as described in the stated literature, basic catalysts such as for example not only alkali metal and alkaline earth metal hydroxides and oxides but also ammonium or phosphonium salts, hereinafter also designated onium salts.

Preferably, onium salts are used, particularly preferably phosphonium salts.

Phosphonium salts for the purposes of the invention are those of the formula (8)

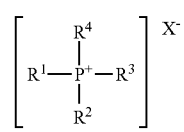

(8)

wherein $R^{1-4}$ independently denote $C_1$-$C_{10}$ alkyls, $C_6$-$C_{10}$ aryls, $C_7$-$C_{10}$ aralkyls or $C_5$-$C_6$ cycloalkyls, preferably methyl or $C_6$-$C_{14}$ aryls, particularly preferably methyl or phenyl, and X⁻ denotes an anion such as hydroxide, sulfate, hydrogensulfate, hydrogencarbonate, carbonate, a halide, preferably chloride, or an alkoxide of the formula OR, wherein R may be $C_6$-$C_{14}$ aryl or $C_7$-$C_{12}$ aralkyl, preferably phenyl. Preferred catalysts are tetraphenylphosphonium chloride, tetraphenylphosphonium hydroxide, tetraphenylphosphonium phenolate, particularly preferably tetraphenylphosphonium phenolate.

The catalysts are preferably used in quantities of $10^{-8}$ to $10^{-3}$ mol, particularly preferably in quantities of $10^{-7}$ to $10^{-4}$ mol, relative to one mol of diphenol.

Further catalysts may be used alone or optionally in addition to the onium salt in order to increase the speed of polymerisation. Such catalysts include salts of alkali metals and alkaline earth metals, such as hydroxides, alkoxides and aryloxides of lithium, sodium and potassium, preferably hydroxide, alkoxide or aryloxide salts of sodium. Sodium hydroxide and sodium phenolate are most preferred. The quantities of the cocatalyst may be within the range from 1 to 200 ppb, preferably from 5 to 150 ppb and most preferably from 10 to 125 ppb, in each case calculated as sodium.

The melt transesterification reaction of the aromatic diphenol and the carbonic acid diesters is preferably performed in two stages. In the first stage, the aromatic diphenol and the carbonic acid diester are melted in 0 to 5 hours, preferably 0.25 to 3 hours, under standard pressure at temperatures of 80 to 250° C., preferably 100 to 230° C., particularly preferably 120 to 190° C. After addition of the catalyst, the oligocarbonate is produced from the aromatic diphenol and the carbonic acid diester by removing the monophenol by distillation by applying a vacuum (down to 2 mm Hg) and raising the temperature (to up to 260° C.). This stage generates the majority of the vapor from the process. The resultant oligocarbonate has a weight average molecular weight, $M_w$, (determined by measuring the rel. solution viscosity in dichloromethane or in mixtures of identical quantities by weight of phenol/o-dichlorobenzene, calibrated by light scattering) in the range from 2000 g/mol to 18,000 g/mol preferably from 4000 g/mol to 15,000 g/mol.

In the second stage, the polycarbonate is produced on polycondensation by further increasing the temperature to 250-320° C., preferably 270-295° C. and a pressure of <2 mm Hg. The remainder of the vapors are removed from the process in this stage.

The catalysts may also be used in combinations (of two or more) with one another.

When alkali/alkaline earth metal catalysts are used, it may be advantageous to add the alkali/alkaline earth metal catalysts at a later point in time (for example after oligocarbonate synthesis on polycondensation in the second stage).

For the purposes of the process according to the invention, the reaction of the aromatic diphenol and the carbonic acid diester to yield the polycarbonate may be performed discontinuously or preferably continuously, for example in stirred-tank reactors, film evaporators, falling film evaporators, stirred-tank reactor cascades, extruders, kneaders, simple disk reactors and high viscosity disk reactors.

The definitions, parameters, compounds and explanations stated in the present description or in preferential ranges may, however, also be combined with one another at will, i.e. between the particular ranges and preferential ranges.

The branched polycarbonates and copolycarbonates according to the invention may be worked up in known manner and processed into any desired moldings, for example by extrusion, injection molding or extrusion blow molding.

Still other aromatic polycarbonates and/or other aromatic polyester carbonates and/or other aromatic polyesters may be added to the branched polycarbonates and copolycarbonates according to the invention in known manner, for example by compounding.

Additives conventional for these thermoplastics, such as fillers, UV-stabilizers, heat stabilizers, antistatic agents and pigments may also be added in conventional quantities to the branched polycarbonates and copolycarbonates according to the invention; demolding behavior, flow behavior, and/or the flame resistance may optionally be improved by addition of external mold release agents, rheological agents and/or flame retardants (for example alkyl and aryl phosphites, phosphates, phosphanes, low molecular weight carboxylic acid esters, halogen compounds, salts, chalk, silica flour, glass and carbon fibers, pigments and combinations thereof. Such compounds are described, for example, in WO 99/55772, p. 15-25, and in the corresponding chapters of the "Plastics Additives Handbook", ed. Hans Zweifel, 5$^{th}$ edition 2000, Hanser Publishers, Munich).

The branched polycarbonates and copolycarbonates according to the invention, optionally blended with other thermoplastics and/or conventional additives, may, once processed into any desired moldings/extrudates, be used in any applications in which already known polycarbonates, polyester carbonates and polyesters are used. Due to this range of properties, they are in particular suitable as materials for injection molding relatively large moldings, for example automotive glazing and sheet products. They are, however, also suitable as substrate materials for optical data storage media such as for example CD, CD-R, DVD, or DVD-R, and may also, for example, be used as films in the electrical sector, as moldings in vehicle construction and as sheet for covers in safety applications. The polycarbonates according to the invention may be used for the production of safety panels which, as is known, are required in many areas of buildings, vehicles and aircraft, and as helmet visors; films, in particular ski films; blow moldings (c.f. for example U.S. Pat. No. 2,964,794), for example 1 to 5 gallon water bottles; light-transmitting sheets, in particular cellular sheets, for example for roofing buildings such as stations, greenhouses and for lighting systems; optical data storage media; traffic light housings or traffic signs; foams (c.f. for example DE-B 1 031 507); yarns and filaments (c.f. for example DE-B 1 137 167 and DE-A 1 785 137). Polycarbonates may furthermore be used as translucent plastics with a content of glass fibers for lighting applications (c.f. for example DE-A 1 554 020) or with a content of barium sulfate, titanium dioxide and/or zirconium oxide or organic polymeric acrylate rubbers (EP-A 634 445, EP-A 269324) for the production of light-transmitting and light-scattering moldings, as substrate materials for organic photoconductors, for the production of precision injection moldings, such as for example lens mountings. In the latter case, the polycarbonates used are those which have a content of glass fibers and optionally additionally approx. 1-10 wt. % of $MoS_2$, relative to total weight. The polycarbonates according to the invention may furthermore be used for the production of optical instrument parts, in particular lenses for still and video cameras (c.f. for example DE-A 2 701 173); light transmission substrates, in particular optical fiber cables (c.f. for example EP-A 0 089 801); electrical insulating materials for electrical conductors and for plug sockets and connectors; mobile telephone casings with improved resistance to perfume, aftershave and sweat; network interface devices; lamps, e.g. headlight/spotlight lamps, diffuser disks or internal lenses and strip lights; medical devices, for example oxygenators, dialysers; foodstuff applications, such as for example bottles, crockery and chocolate molds; automotive applications where contact with fuels and lubricants may occur, such as for example bumpers, optionally in the form of suitable blends with ABS or suitable rubbers; sports articles such as for example slalom poles, ski boot fasteners; household articles such as for example kitchen sinks and letter boxes; housings, such as for example electrical distribution cabinets; housings for electric toothbrushes and hair dryer housings; transparent washing machine portholes with improved resistance to the washing solution; safety glasses, optical vision-correcting glasses; lamp covers for cooking installations with improved resistance to cooking vapors, in particular oil vapors; packaging films for pharmaceutical preparations; chip boxes and chip carriers or for the production of other applications such as stall-feeding doors or animal cages.

The moldings and extrudates obtainable from the polymers according to the invention are also provided by the present application.

The following Examples are intended to illustrate the invention, but without restricting its scope.

EXAMPLES

Relative solution viscosity is determined on 0.5 g of polymer in 100 ml of methylene chloride at 20° C.

The melt volume rate (MVR) is determined according to ISO 1133.

The intrinsic melt volume rate (IMVR) is determined according to ISO 1133
but with the sample being conditioned prior to measurement for 20 min at the measurement temperature (in the following examples 300° C.).

VICAT temperature is determined according to ISO 306.

Notched impact strength is determined according to ISO 180/4A at room temperature.

Yield stress, elongation and modulus of elasticity are determined according to ISO 527.

Tear strength and elongation at break are determined according to ISO 527.

Example 1

Synthesis of 2,4-bis[1-(4-hydroxyphenyl)-1-methylethyl]phenol ("trisphenol")

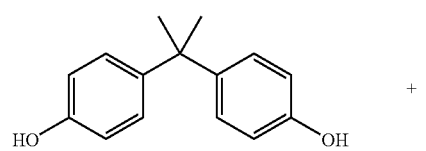
+

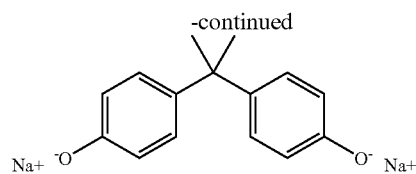

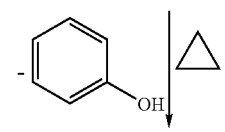

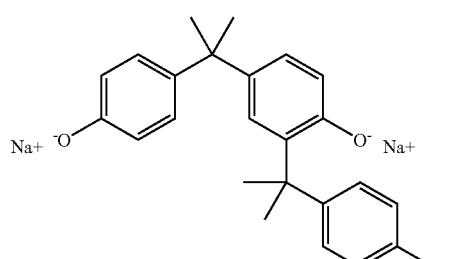

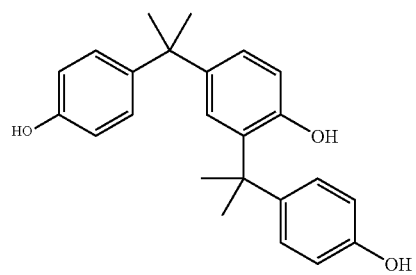

1712 g (5.00 mol) of bisphenol A (BPA, Bayer AG) are melted at 190° C. under a nitrogen atmosphere. 20.4 g (0.05 mol) of solid sodium bisphenolate (Na$_2$BPA) are then added. The phenol formed is removed from the resultant melt at a bottoms temperature of 180-190° C. by distillation under a water-jet vacuum (15-20 mbar). The batch preparation is repeated five times and the crude material, from which the phenol has been removed (after separation of a total of 353 g; 3.75 mol of phenol), is combined.

The crude material is recrystallized in three portions from in each case 3850 ml of toluene with 75 ml of (conc.) acetic acid. Approx. 7 kg of (moist) crystalline product with a trisphenol content of approx. 45% are obtained. This material is extracted at 100° C. in 1 kg portions with in each case 3 l of toluene. Extraction is performed by stirring the toluene suspension at 100° C. for approx. 15 min. and then hot-filtering it. The extraction residues together yield 1540 g (moist) with a trisphenol content of approx. 85%. The entire quantity is again extracted twice with 4 l of toluene at 100° C. and the extraction residue is dried under a vacuum at 80° C. 995.5 g of product are obtained with a content of 94.2% trisphenol. The trisphenol content is further increased by extracting once more with 3 l of toluene at 80° C. After drying at 80° C. under a vacuum, 945 g of a beige powder are obtained with a content of trisphenol of 97.9%, which corresponds to an overall yield of 11.6%. The remainder consists of bisphenol A.

Yield: 945 g (11.6% of theoretical) of a white-beige powder.

Analysis:
GC-MS after derivatisation as the trimethylsilyl derivative: The expected mass of 362 is here found as the product peak. Purity: 97.94% (1.79% BPA identified as impurity).

Example 2

118 ml of methylene chloride and 30 ml of chlorobenzene are added to a nitrogen-inertised solution of 15.862 g (0.0694 mol) of bisphenol A and 6.13 g (0.153 mol) of sodium hydroxide in 118 ml of water. 0.081 g (0.00022 mol or 0.32 mol % relative to bisphenol A) of the branching agent from Example 1 and 0.3559 g (0.00237 mol or 3.4 mol % relative to bisphenol A) of p-tert.-butylphenol (BUP) as chain terminator are added in a single-stage procedure. At a pH value of 13.4 and 20° C., 9.6 ml (0.1394 mol) of phosgene are added over the course of 1 hour. In order to prevent the pH value from falling below 12.6, 25% strength sodium hydroxide solution is added during the phosgenation. After completion of phosgenation and flushing with nitrogen, 96.7 µl (0.0007 mol, 1 mol % relative to bisphenol A) of N-ethylpiperidine are added as catalyst and stirring is continued for 1 hour. After separation of the aqueous phase, the organic phase is acidified with phosphoric acid and washed with distilled water until neutral and salt-free. 16.8 g of polycarbonate are obtained after precipitation in methanol and drying in a vacuum drying cabinet at 80° C.

Analysis:
Relative solution viscosity in methylene chloride (0.5 g/100 ml of solution): 1.310/1.315
GPC (calibration against BPA polycarbonate): molecular weight Mw=31789, Mn=14010, dispersion index D=2.27

Example 3

28.4 l of methylene chloride and 9 l of chlorobenzene are added to a nitrogen-inertised solution of 4096.3 g (17.94 mol) of bisphenol A and 1584 g (39.6 mol) of sodium hydroxide in 28.4 l of water. 20.88 g (0.0576 mol or 0.32 mol % relative to bisphenol A) of the branching agent from Example 1 and 91.92 g (0.612 mol or 3.4 mol % relative to bisphenol A) of p-tert.-butylphenol (BUP) as chain terminator are added in a single-stage procedure. At a pH value of 13.4 and 21° C., 3560 g (36 mol) of phosgene are added over the course of 1 hour and 20 minutes. In order to prevent the pH value from falling below 12.6, 25% strength sodium hydroxide solution is added during the phosgenation. After completion of phosgenation and flushing with nitrogen, 24.7 ml (0.18 mol, 1 mol % relative to bisphenol A) of N-ethylpiperidine are added as catalyst and stirring is continued for 1 hour. After separation of the aqueous phase, the organic phase is acidified with phosphoric acid and washed with distilled water until neutral and salt-free. After solvent exchange for chlorobenzene, the product is extruded through a devolatilizing extruder.

3460 g of polycarbonate are obtained (after discarding the first runnings).

Analysis:
Relative solution viscosity in methylene chloride (0.5 g/100 ml of solution): 1.34
MVR 300° C./1.2 kg: 1.7 ml/10 min
IMVR 300° C./1.2 kg 20 min: 1.7 ml/10 min
Vicat VSTB 50: 153.2° C.

Example 4

28.4 l of methylene chloride and 9 l of chlorobenzene are added to a nitrogen-inertised solution of 4096.3 g (17.94 mol) of bisphenol A and 1584 g (39.6 mol) of sodium hydroxide in 28.4 l of water. 19.57 g (0.054 mol or 0.30 mol % relative to bisphenol A) of the branching agent from Example 1 and 57.6 g (0.612 mol or 3.4 mol % relative to bisphenol A) of phenol as chain terminator are added in a single-stage procedure. At a pH value of 13.4 and 21° C., 3560 g (36 mol) of phosgene are added over the course of 1 hour and 20 minutes. In order to prevent the pH value from falling below 12.6, 25% strength sodium hydroxide solution is added during the phosgenation. After completion of phosgenation and flushing with nitrogen, 24.7 ml (0.18 mol, 1 mol % relative to bisphenol A) of N-ethylpiperidine are added as catalyst and stirring is continued for 1 hour. After separation of the aqueous phase, the organic phase is acidified with phosphoric acid and washed with distilled water until neutral and salt-free. After solvent exchange for chlorobenzene, the product is extruded through a devolatilizing extruder.

3732 g of polycarbonate are obtained (after discarding the first runnings).

Analysis:
Relative solution viscosity in methylene chloride (0.5 g/100 ml of solution): 1.340
MVR 300° C./1.2 kg: 2.4 ml/10 min
IMVR 300° C./1.2 kg 20 min: 2.2 ml/10 min
Vicat VSTB 50: 149.6° C.

Example 5

28.4 l of methylene chloride and 9 l of chlorobenzene are added to a nitrogen-inertised solution of 4096.3 g (17.94 mol) of bisphenol A and 1584 g (39.6 mol) of sodium hydroxide in 28.4 l of water. 19.57 g (0.054 mol or 0.30 mol % relative to bisphenol A) of the branching agent from Example 1 and 66.06 g (0.702 mol or 3.9 mol % relative to bisphenol A) of phenol as chain terminator are added in a single-stage procedure. At a pH value of 13.4 and 21° C., 3560 g (36 mol) of phosgene are added over the course of 1 hour and 20 minutes. In order to prevent the pH value from falling below 12.6, 25% strength sodium hydroxide solution is added during the phosgenation. After completion of phosgenation and flushing with nitrogen, 24.7 ml (0.18 mol, 1 mol % relative to bisphenol A) of N-ethylpiperidine are added as catalyst and stirring is continued for 1 hour. After separation of the aqueous phase, the organic phase is acidified with phosphoric acid and washed with distilled water until neutral and salt-free. After solvent exchange for chlorobenzene, the product is extruded through a devolatilizing extruder.

3775 g of polycarbonate are obtained (after discarding the first runnings).

Analysis:
Relative solution viscosity in methylene chloride (0.5 g/100 ml of solution): 1.303
MVR 300° C./1.2 kg: 4.2 ml/10 min
IMVR 300° C./1.2 kg 20 min: 4.3 ml/10 min Vicat VSTB 50: 147.5° C.

The melt index MVR states the number of grams of heated thermoplastic product which, under the action of a defined force, pass through a standardised nozzle in 10 minutes at a specific temperature. In the present case, the force is 1.2 kg and the temperature 300° C. In the case of IMVR, the sample is kept in the instrument at 300° C. for 20 minutes prior to extrusion. If any polymer degradation occurs during this period, depending on the degree of degradation, higher values are obtained than in the MVR test. After such exposure, the product is more highly fluid and more material can flow through the nozzle. If, within the bounds of measurement accuracy/the limit of error, the MVR and IMVR values are virtually identical, this establishes the thermal stability of the material (c.f. Examples 3 to 5).

Example 6

24.1 l of methylene chloride and 12.4 l of chlorobenzene are added to a nitrogen-inertised solution of 4566 g (20 mol) of bisphenol A and 1760 g (44 mol) of sodium hydroxide in 36.5 l of water. 21.75 g (0.06 mol or 0.30 mol % relative to bisphenol A) of the branching agent from Example 1 and 67.76 g (0.72 mol or 3.6 mol % relative to bisphenol A) of phenol as chain terminator are added in a single-stage procedure. At a pH value of 13.4 and 21° C., 3956 g (40 mol) of phosgene are added over the course of 1 hour and 20 minutes. In order to prevent the pH value from falling below 12.6, 30% strength sodium hydroxide solution is added during the phosgenation. After completion of phosgenation and flushing with nitrogen, 24.7 ml (0.18 mol, 1 mol % relative to bisphenol A) of N-ethylpiperidine are added as catalyst and stirring is continued for 1 hour. After separation of the aqueous phase, the organic phase is acidified with phosphoric acid and washed with distilled water until neutral and salt-free. After solvent exchange for chlorobenzene, the product is extruded through a devolatilizing extruder.

4020 g of polycarbonate are obtained (after discarding the first runnings).

Analysis:
Relative solution viscosity in methylene chloride (0.5 g/100 ml of solution): 1.320
GPC (calibration against BPA polycarbonate): molecular weight Mw=34441, Mn=11334, dispersion index D=3.04

Physical Properties of the Polycarbonates According to the Invention:

Mechanical Properties of the Branched Polycarbonate from Example 3:

| | |
|---|---|
| Notched impact strength ISO 180/4A RT [kJ/m$^2$]: | 10x82z |
| Yield stress ISO 527: | 63 N/mm$^2$ |
| Elongation ISO 527: | 6.5% |
| Tear strength (ISO 527): | 61 N/mm$^2$ |
| Elongation at break (ISO 527): | 90% |
| Modulus of elasticity (ISO 527) | 2201 N/mm$^2$ |

Comparative Example 1

Branched polycarbonate with bisphenol A as diphenol and isatin biscresol as branching agent (0.3%) with phenol as chain terminator and an MVR of 3.

| Properties | Comparative Example 1 |
|---|---|
| Notched impact strength ISO 180/4 A RT [kJ/m$^2$]: | 10x80z |
| Yield stress: | 65 N/mm$^2$ |
| Elongation: | 6.5% |
| Tear strength: | 62 N/mm$^2$ |
| Elongation at break: | 85% |
| Modulus of elasticity: | 2304 N/mm$^2$ |

Properties of the Branched Polycarbonate from Example 4:

| | |
|---|---|
| Notched impact strength ISO 180/4A RT [kJ/m$^2$]: | 10x80z |
| Yield stress: | 65 N/mm$^2$ |
| Elongation: | 6.4% |
| Tear strength: | 64 N/mm$^2$ |
| Elongation at break: | 96% |
| Modulus of elasticity: | 2316 N/mm$^2$ |

Properties of the Branched Polycarbonate from Example 5:

| | |
|---|---|
| Notched impact strength ISO 180/4A RT [kJ/m$^2$]: | 10x79z |
| Yield stress: | 64 N/mm$^2$ |
| Elongation: | 6.4% |
| Tear strength: | 64 N/mm$^2$ |
| Elongation at break: | 109% |
| Modulus of elasticity: | 2295 N/mm$^2$ |

Comparison of Examples 1, 4 and 5 according to the invention with Comparative Example 1 reveals an improved elongation at break with the other mechanical properties being otherwise comparable.

Example 7

The thermal stability of the products may be demonstrated with reference to various branched polycarbonates similar to Examples 3-5 above.

Polymer According to Example 3:
MVR 300° C./1.2 kg: 1.7 ml/10 min IMVR 300° C./1.2 kg 20 min: 1.7 ml/10 min Polymer According to Example 4:
MVR 300° C./1.2 kg: 2.4 ml/10 min IMVR 300° C./1.2 kg 20 min: 2.2 ml/10 min Polymer According to Example 5:
MVR 300° C./1.2 kg: 4.2 m/10 min IMVR 300° C./1.2 kg 20 min: 4.3 ml/10 min The results from the MVR and IMVR measurements show that the branched structural elements are thermally stable.

Determination of viscosity as a function of shear rate (ISO 11443) likewise enables a statement to be made with regard to thermal stability:

The pseudoplasticity determined below additionally proves that the branch points are still intact even after thermal stress and any supposed impurities in the branching agent used are not harmful. Thus, no degradation of the branching structural unit occurs.

The branched polycarbonate obtained in Example 3 is subjected to rheological investigation at 260, 280 and 300° C. The following data are obtained:

| Shear rate [s$^{-1}$] | Viscosity [Pas]/260° C. | /280° C. | /300° C. |
|---|---|---|---|
| 50 | 3537 | 1857 | 1034 |
| 100 | 2754 | 1518 | 882 |
| 200 | 2123 | 1220 | 724 |
| 500 | 1323 | 838 | 536 |
| 1000 | 884 | 582 | 394 |
| 1500 | 675 | 454 | 325 |
| 5000 | — | 198 | 154 |

These are typical values for pseudoplastic, branched materials.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. In the process of producing branched polycarbonate by the phase boundary process the improvement comprising using at least one compound conforming to formula (1)

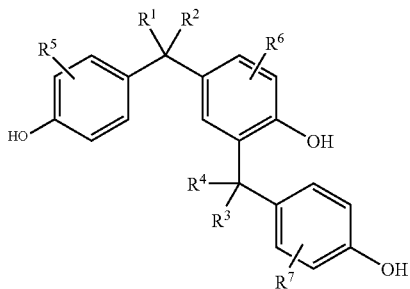

in which
$R^1$, $R^2$, $R^3$ and $R^4$ mutually independently denote $C_1$-$C_{10}$ alkyl,
$R^5$, $R^6$ and $R^7$ mutually independently denote hydrogen or $C_1$-$C_{10}$ alkyl, or
$R^1$ and $R^2$, and $R^3$ and $R^4$, with the carbon atom to which they are attached, form a $C_5$-$C_{10}$ cycloalkyl group, wherein the cycloalkyl group may be substituted said compound characterized in that it is the crude, unpurified product of re-crystallization or melt crystallization of bisphenol A or its derivative.

2. In the process of producing branched polycarbonate by the melt transesterification process the improvement comprising using at least one compound conforming to formula (1)

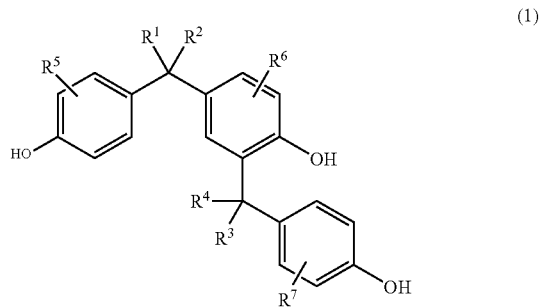

in which
$R^1$, $R^2$, $R^3$ and $R^4$ mutually independently denote $C_1$-$C_{10}$ alkyl,
$R^5$, $R^6$ and $R^7$ mutually independently denote hydrogen or $C_1$-$C_{10}$ alkyl, or
$R^1$ and $R^2$, and $R^3$ and $R^4$, with the carbon atom to which they are attached, form a $C_5$-$C_{10}$ cycloalkyl group, wherein the cycloalkyl group may be substituted said compound characterized in that it is the crude, unpurified product of re-crystallization or melt crystallization of bisphenol A or its derivative.

3. The process of claim 1 wherein said compound is the distillation product of a bisphenol A stream from its production.

4. The process of claim 2 wherein said compound is the distillation product of a bisphenol A stream from its production.

* * * * *